(12) United States Patent
Gimblet

(10) Patent No.: US 6,542,674 B1
(45) Date of Patent: Apr. 1, 2003

(54) FIBER OPTIC CABLES WITH STRENGTH MEMBERS

(75) Inventor: Michael J. Gimblet, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/645,916

(22) Filed: Aug. 25, 2000

(51) Int. Cl.[7] ................................................. G02B 6/44
(52) U.S. Cl. ...................................................... 385/113
(58) Field of Search ................................. 385/100, 101, 385/103, 106, 109, 110, 111, 112, 113, 114

(56) References Cited

U.S. PATENT DOCUMENTS

| | | | |
|---|---|---|---|
| 4,359,598 A | 11/1982 | Dey et al. | 174/40 R |
| 4,401,361 A | 8/1983 | Slaughter | 350/96.23 |
| 4,420,220 A | 12/1983 | Dean et al. | 350/96.23 |
| 4,729,628 A | 3/1988 | Kraft et al. | 350/96.23 |
| 5,155,304 A | 10/1992 | Gossett et al. | 174/117 R |
| 5,188,883 A | 2/1993 | Rawlyk | 428/189 |
| 5,448,670 A | 9/1995 | Blew et al. | 385/112 |
| 5,469,523 A | 11/1995 | Blew et al. | 385/101 |
| 5,651,081 A | 7/1997 | Blew et al. | 385/101 |
| 6,088,499 A * | 7/2000 | Newton et al. | 385/112 |
| 6,249,628 B1 * | 6/2001 | Rutterman et al. | 385/106 |
| 6,249,629 B1 * | 6/2001 | Bringuier | 385/113 |
| 6,278,824 B1 * | 8/2001 | Bosisio et al. | 385/100 |
| 6,424,771 B1 * | 7/2002 | Sheu | 385/102 |

FOREIGN PATENT DOCUMENTS

| | | | |
|---|---|---|---|
| EP | 0 629 889 A1 | 12/1994 | G02B/6/44 |
| JP | 8-304675 | 11/1996 | G02B/6/44 |

OTHER PUBLICATIONS

Patent Abstract of Japan; 08304675A; Nov. 22, 1996.

* cited by examiner

*Primary Examiner*—Tulsidas Patel
*Assistant Examiner*—Thanh-Tam Le
(74) *Attorney, Agent, or Firm*—Timothy J. Aberle

(57) ABSTRACT

A fiber optic cable having at least two strength components (20), an optical transmission component (12), and at least one tensile strength member (26) disposed generally adjacent at least one of the strength components (20), a strength member (26) to strength component (20) tensile strength ratio being about 0.1 to about 0.3. In another aspect, a fiber optic cable having at least two strength components (20), an optical transmission component (12), and at least one tensile strength member (26) being generally interposed between the optical transmission component (12) and at least one of the strength components (20), the tensile strength member (26) being multi-functional in that it preferably provides tensile strength and waterblocking. And in another aspect, a fiber optic cable with strength members (20) and strength components (26) comprising respective tensile strength ratings and defining an overall tensile strength rating ratio of about 0.25 to about 0.5.

17 Claims, 1 Drawing Sheet

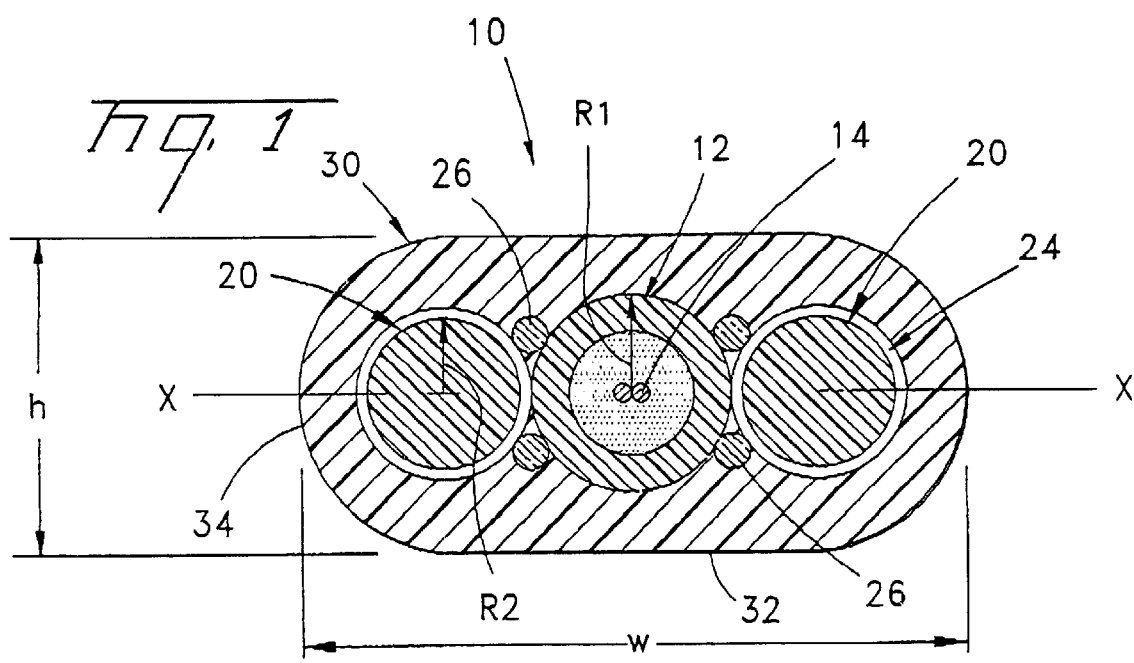

FIBER OPTIC CABLES WITH STRENGTH MEMBERS

FIELD OF INVENTION

The present invention relates to fiber optic cables, and, more particularly, to fiber optic cables that include at least one optical transmission component and at least one strength component.

BACKGROUND OF THE INVENTION

Fiber optic cables include at least one optical fiber that can transmit data, computer, and/or telecommunication information. Conventional cable designs, however, can have unacceptable optical performance characteristics, and/or can require undesirable structural features that make optical fiber access difficult. In addition, conventional cables can be difficult to route through cable passageways, and/or can make the cable expensive to produce.

Cable designs that define a backdrop for the present inventions can be, for example, difficult to route through cable passageways and/or can be expensive to produce. U.S. Pat. No. 5,155,304 discloses an aerial service wire that includes a PVC jacket having a generally block-shaped cross section. Enclosed by the jacket are two groups of strength components, each of which includes a plurality of filaments that are impregnated with a plastic material. Moreover, conventional aerial fiber optic cables can be too large for some applications. For example, EP-A1-0629889 discloses an aerial cable requiring an optical cable central part with two metallic strain relief elements that are placed diametrically opposite to each other and adjacent the optical cable part. The strain relief elements are connected to the cable part by means of a jacket that includes web-like extensions between the optical cable part and the strain relief elements. In addition, optical cables of the single fiber type may not provide adequate data transmission capacity.

SUMMARY OF THE INVENTION

In an aspect of the present invention a flexible fiber optic cable having good tensile strength has at least one optical transmission component and at least two strength components, with at least one tensile strength member disposed between the optical transmission component and at least one strength component. The tensile strength member is preferably multi-functional in that it provides at least tensile strength and waterblocking enhancements. At least one of the strength components can have a nominal radius that is less than the nominal radius of the optical transmission component. The cable has a cable jacket surrounding the optical transmission component, the strength members, and the strength components. The cable has a jacket surrounding the optical transmission component and the strength components.

In another aspect of the invention a fiber optic cable comprises at least two strength components, an optical transmission component, and at least one tensile strength member disposed generally adjacent at least one of the strength components, a single strength member to a single strength component tensile strength rating ratio being about 0.1 to about 0.3. In another aspect, an overall multiple strength members to multiple strength components tensile strength rating ratio being about 0.25 to about 0.5.

BRIEF DESCRIPTION OF THE DRAWING FIGURES

FIG. 1 is a cross sectional view of an exemplary fiber optic cable according to the present invention.

DETAILED DESCRIPTION OF THE INVENTION

With reference to FIG. 1, fiber optic cable 10 according to the present invention will be described. Fiber optic cable 10 comprises at least one optical transmission component, for example, a buffer tube 12 having at least one, but preferably two, optical fibers 14 loosely received therein. The optical fibers are preferably silica-based, single mode fibers, but they can be any type of optical fiber including, for example, a multi-mode or dispersion shifted optical fibers. Buffer tube 12 preferably comprises a nominal outer radius R1 of about 1.5 mm, and is preferably formed of polypropylene and blends thereof, but it can be formed of, for example, polyethylene and blends thereof. Preferably, buffer tube 12 includes at least one waterblocking substance, for example, a gel, grease, and/or a superabsorbent material. In the preferred embodiment, a waterblocking grease fills tube 12.

In the preferred embodiment, the optical transmission component is disposed between at least two strength components 20 and four strength members 26. Preferably, strength components 20 are solid, rod-like members formed of dielectric materials. For example, a component 20 comprises glass filaments impregnated and bonded together with a resin to define a single unit having a tensile strength rating of about 500 Newtons @ 0.5% strain. Strength components 20 have both tensile and anti-buckling characteristics. The bending modulus of a strength component 20 can be about at least twice that of a strength member 26, thus strength components are relatively stiff.

Strength members 26 are preferably tensile strength members, formed of a group of fiberglass strands. Most preferably, the strength members 26 are multifunctional, including fibrous strength members and a superabsorbent material disposed on and between the strength fibers. The fibrous strength members provide tensile strength, having a tensile strength rating of about 90 Newtons @ 0.5% strain. The superabsorbent material provides waterblocking protection for inhibiting the migration of water in the cable. Suitable strength members 26 are made commercially available by Owens Corning. In further aspects of the present invention, a strength member 26 to strength component 20 tensile strength rating ratio is about 0.1 to about 0.3. Assuming, e.g., a count of four strength members 26, and assuming, e.g., a count of two components 20, a further aspect of the present invention is an overall tensile strength rating ratio of about 0.25 to about 0.5. The combination of strength components 20 and strength members 26, with their respective select tensile strength ratings, allows cables of the present invention to withstand high tensile loads and yet have a suitable overall bending flexibility.

Strength components 20 comprise a nominal radius R2, and preferably comprise a coating 24 adhered to respective outer surfaces thereof. Coating 24 may include a water swellable powder in a plastic matrix. Nominal radius R2 preferably is, for example, about 0.5 mm to about 1.8 mm, but it is most preferably about 0.8 mm. In the preferred embodiment, the nominal radius R1 of tube 12 is greater than the nominal radius R2 of strength members 20.

Optical transmission component 12 and strength components 20 are preferably surrounded by a cable jacket 30 formed of a thermoplastic, e.g., PVC or MDPE. In the preferred embodiment, fiber optic cable 10 is generally of a flat configuration. Jacket of fiber optic cable 10 comprises generally arcuate sections 34 and generally flat-sided sections 32. In the preferred embodiment, width w of fiber optic cable 10 is about 9.0 mm to about 10.0 mm, and the height h of fiber optic cable 10 or 40 is preferably about 4.0 mm to about 5.0 mm.

In the preferred embodiment, strength components 20 are located generally adjacent to optical transmission component 12 with strength members 26 placed therebetween. At least one but preferably both of strength members 20 are generally in contact with at least a portion of the optical transmission component. At least one but preferably all of strength members 26 are generally in contact with one or the other of the optical transmission component and a strength component, but most preferably the strength members are generally in contact with both (FIG. 1). In other words, in the most preferred embodiment, there is at least general contact between optical transmission component 12 and both strength components 20, and between the strength members 26 and the strength components and optical transmission component. Alternatively, jacketing material having a thickness of less than about 1.0 mm can be interposed between the optical transmission component and at least one strength component (not shown). Additionally, the respective centers of strength components 20 and optical transmission component 12 are preferably generally aligned in a preferential bend axis X—X.

The preferred mode of manufacture of cables according to the present invention is preferably accomplished by operation of pressure extrusion tooling (not shown). The extrusion tooling is operative to extrude jacketing material 30 about strength components 20, strength members 26, and at least one optical transmission component 12. As components 12, 20, 26 are fed into the extrusion tooling, a jacketing compound, e.g., polyethylene, is supplied under suitable temperature and pressure conditions to the tooling. The jacketing compound is channeled toward a die and a. tip. The jacketing compound then coats components 12, 20, 26 thereby forming jacket 30 therearound. Pressure extrusion of the melt through on appropriately shaped die orifice results in the formation of a jacket 30 with generally flat sides 32, as exemplified by the embodiment of FIG. 1. Alternatively, tubing-on plus vacuum drawing the melt during extrusion can form jacket 30 as well.

An exemplary transmission component access procedure includes using a knife to shave off arcuate sections 34, and sections 32 are peeled away from the buffer tube. The buffer tube is then removed with a ring-cutting tool, and the optical fibers can then be exposed for connectorization or splicing procedures. When installed, cables made according to the present invention should have a long service life, as the cables meet most if not all of TELCORDIA GR-20 and/or ICEA 640 mechanical and environmental requirements.

The present invention has been described with reference to the foregoing exemplary embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, optical transmission component 12 may comprise at least one tight buffered fiber and/or a bundle of optical fibers. As an alternative to glass reinforced plastic, strength components can be metallic or aramid fibers impregnated with a suitable plastic material. Additionally, more than two strength members can be included in cable 10. Although a circular cross section for strength components is preferred, other cross sectional shapes may be used as well. The concepts described herein can be applied to many cable designs, for example, self-supporting, buried, indoor, and indoor/outdoor cable applications. Flame retardant jacket materials can be selected to achieve plenum, riser, or LSZH flame ratings.

Additional water blocking protection can be added. For example, at least one water-swellable tape or yarn (not shown) can be disposed adjacent to the optical transmission component. Preferably two water-swellable yarns can be counter-helically stranded about tube 12. Cables according to the present invention can include at least one electrical conductor for power or data transmission, for example, at least one coaxial or single wire, or a twisted pair of wires. Ripcords and/or an armor layer can be added adjacent tube 12. The fibers 14 can be loose, or in bundled, tight buffered, and/or or optical fiber ribbon form. One or more strength members 26 can be disposed away from the optical transmission component in locations other than as shown in FIG. 1, for example, on a side of the strength component generally opposite the optical transmission component.

Accordingly, what is claimed is:

1. A fiber optic cable, comprising:
at least two strength components, an optical transmission component, and at least two tensile strength members, the tensile strength members being generally interposed between the optical transmission component and at least one of said strength components, at least one of the tensile strength members being multifunctional in that it provides tensile strength and waterblocking, the respective tensile strength ratings of one of said tensile strength members and at least one of said strength components being unequal.

2. The fiber optic cable of claim 1, said optical transmission component comprising a buffer tube with at least one optical fiber therein.

3. The fiber optic cable of claim 1, each of said strength components being generally in contact with said optical transmission component.

4. The fiber optic cable of claim 1, said at least two tensile strength members disposed on opposing sides of said optical transmission component.

5. The fiber optic cable of claim 1, at least one of said strength components being formed of a dielectric material.

6. The fiber optic cable of claim 1, at least one of said tensile strength members comprising a superabsorbent material.

7. The fiber optic cable of claim 1, said at least two strength components comprising rod-like members.

8. The fiber optic cable of claim 1, said at least two strength components and said at least one optical transmission component having respective centers that are generally aligned defining a preferential bend axis.

9. The fiber optic cable of claim 1, at least one water-swellable yarn being helically stranded about said optical transmission component.

10. The fiber optic cable of claim 1, one of said at least two strength members comprising fiberglass strands.

11. The fiber optic cable of claim 1, further comprising a jacket, said jacket contacting at least a portion of said optical transmission component.

12. The fiber optic cable of claim 1, said at least two tensile strength members being a portion of a plurality of , quadrilaterally disposed strength members arranged about said optical transmission component.

13. A fiber optic cable, comprising:
at least two strength components having respective tensile strength ratings, an optical transmission component, and at least one tensile strength member having a tensile strength rating disposed generally adjacent at least one of said strength components, said strength member and one of said strength components defining a tensile strength rating ratio of about 0.1 to about 0.3.

14. The fiber optic cable of claim 13, said tensile strength rating ratio being about 0.18.

15. The fiber optic cable of claim 13, said strength components defining a preferential bend characteristic in said cable.

16. A fiber optic cable, comprising:
   at least two strength components, an optical transmission component, and tensile strength members disposed generally adjacent at least one of said strength components, said strength members and strength components comprising respective tensile strength ratings and defining an overall tensile strength rating ratio of about 0.25 to about 0.5.

17. The fiber optic cable of claim 16, said strength components defining a preferential bend characteristic in said cable.

* * * * *